M. MILLER.
MACHINE FOR GATHERING STONE.

No. 171,579. Patented Dec. 28, 1875.

Witnesses.
John C. Tunbridge
A. J. Fletcher

Inventor.
Moses Miller,
By O. Drake. Att'y.

UNITED STATES PATENT OFFICE.

MOSES MILLER, OF EAST ORANGE TOWNSHIP, ESSEX COUNTY, NEW JERSEY.

IMPROVEMENT IN MACHINES FOR GATHERING STONES.

Specification forming part of Letters Patent No. 171,579, dated December 28, 1875; application filed June 11, 1875.

*To all whom it may concern:*

Be it known that I, MOSES MILLER, of the township of East Orange, in the county of Essex and State of New Jersey, have invented certain new and useful Improvements in Machines for Gathering and Removing Stones from Land; and I do hereby declare that the following is a full, clear, and exact description thereof, which will enable others skilled in the art to which it pertains to make and use the same, reference being had to the accompanying drawing, and to the letters of reference thereon, which form a part of this specification.

The nature and object of this invention are to facilitate the operation of gathering and picking up stones lying upon, or near to, the surface of the ground, in order to clear such ground for agricultural or other purposes.

My invention consists in the construction of a machine combining certain mechanical appliances, fitted for and adapted to these purposes, as will be hereinafter more fully set forth and shown.

Figure 1:
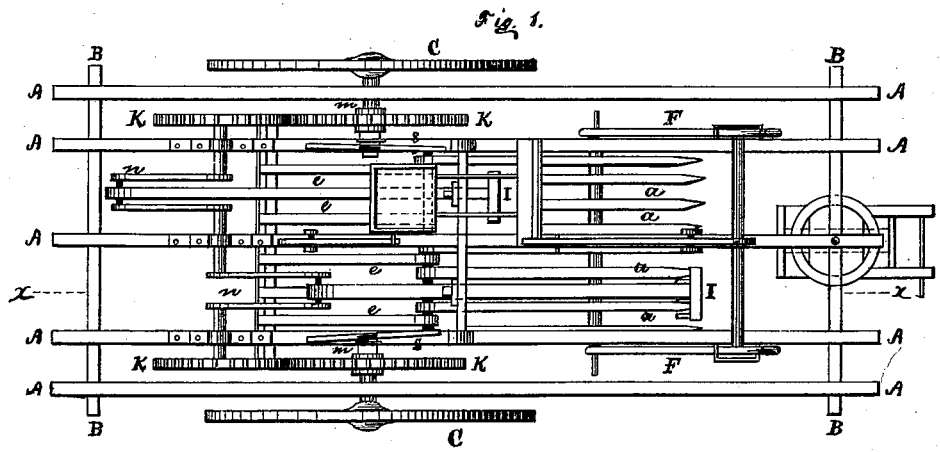
Figure 2:
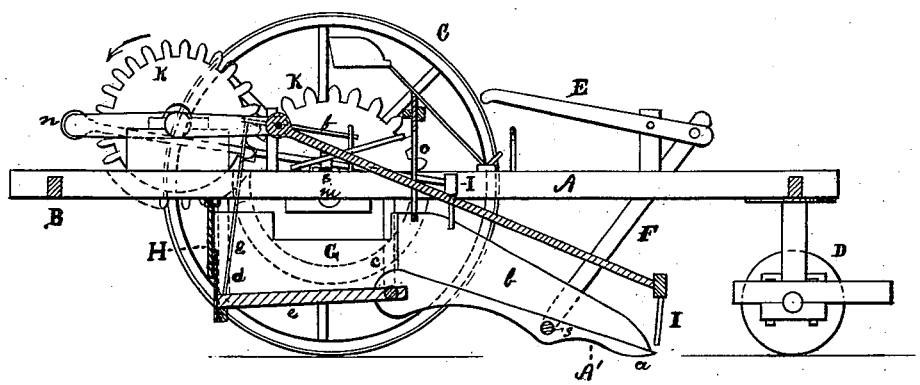

Figure 1 is a top or plan view of a stone-gathering machine combining my improvements. Fig. 2 is a sectional view of the same, taken through the lines $x$.

The beams A and B constitute a frame-work or platform, to or on which the different parts of the mechanism are attached, the whole being supported upon wheels C and D. The scoop or picker A', which is adjustable—that is, made to rise and lower—is composed of a series of fingers, $a$, and side pieces $b$, and is pivoted to depending arms $c$ on each side of the frame, and raised and lowered by means of a lever, E, and arms F, (see Fig. 2,) as occasion may require. A box or receptacle, G, (see Fig. 2,) to hold the stones, is supported beneath the frame by depending arms $c$ and $d$, the bottom of which is composed of a series of bars, $e$, (see Fig. 1,) forming a sort of grate, and is provided with a door, H, (see Fig. 2,) in the back end, made to open and close, to be operated by the driver from his seat on the frame, as also are other parts of the machine, by means of a lever, $f$, and rod $g$, connecting therewith, (see Fig. 2;) or, if preferred, one end of the bottom may be made to drop, for the purpose of discharging a load.

The machine is also provided with two rakes, I, one on each side, designed to operate automatically in conjunction with the scoop or picker, and whose united width is equal thereto, or nearly so, their function being to rake the stones as they are taken up by the picker back into the box or receptacle G, as illustrated in Fig. 2. Said rakes are operated from cog-wheels K, best shown in Fig. 2, on each side of the machine, as follows: One of said cog-wheels is rigidly secured to a shaft, $m$, on each side of the machine, and is made to revolve as the machine is being drawn over the ground, the wheels C being, as a matter of course, also rigidly secured to said shafts, each of the latter being, as will be observed, independent of the other. (See Fig. 1.)

The motion thus imparted to said cog-wheels is also, as a consequence, imparted to the other cog-wheels which are in gear with them, which in their turn, by means of cranks $n$ on two independent shafts, impart a forward and backward motion to the rakes I, their handles being attached thereto, (see Fig. 1,) as also a vertical motion as they are thrown forward, the latter being produced by the slotted arms or guides $o$, through which the handles of the rakes move, and for the purpose of preventing the rake-teeth while moving forward from coming in contact with the stones on the picker. (See Fig. 2.)

It will be seen that the rear ends of the rakes are carried upward as they move back, so that the rake-heads will traverse in contact with the picker, raising the stones upon the same into the receptacle G, while upon the forward movement of each rake it will bear at the lower end of the slot $o$ as a fulcrum, and its forward end will be elevated free from the picker as it passes over the same, and will then suddenly descend in front of the stones collected at the front end of the picker.

As two rakes are employed, operating independently, the outer rake will continue in action, gathering the stones collected at the outer end of the picker when the apparatus is being turned, while the inner rake will be nearly stationary, resuming its operation as the machine moves forward. As the picker is composed of a series of bars, no dust or small stones will be collected, while the construction of the bottom of the receptacle G, in a similar manner permits the escape of the detritus and small broken stones, resulting from the fracture of the larger stones while being carried. Another advantage from constructing the picker as described is, that one or more of the bars *a*, may yield under undue pressure without any other injury than the bending or fracture of the light rod *s*, binding them together.

Provision is made also for throwing the cog-wheels above referred to in and out of gear whenever desired, by means of a suitable shifter, *s*, located so as to be convenient to the driver, and moving the forward wheels K laterally on the axle.

Having thus described my invention, what I claim as new and desire to secure by Letters Patent of the United States, is—

1. The combination, in a stone-gatherer, of a picker, A', receptacle G, and two independent rakes, each operated from one of the wheels, moving forward over the picker, descending suddenly in front thereof, and traversing the picker in moving backward, as set forth.

2. The combination of the rakes, independent crank-shafts carried by the frame of the machine, and cog-wheels K K, gearing with similar wheels on the crank-shafts, and adjustable, as set forth.

In testimony that I claim the foregoing as my own invention, I affix hereto my signature in presence of two witnesses.

MOSES MILLER.

Witnesses:
OLIVER DRAKE,
JOSEPH M. MILLER.